Feb. 28, 1961   G. C. CURTISS   2,973,273
SPONGE CHEWING GUM AND METHOD OF MAKING THE SAME
Filed Feb. 11, 1959
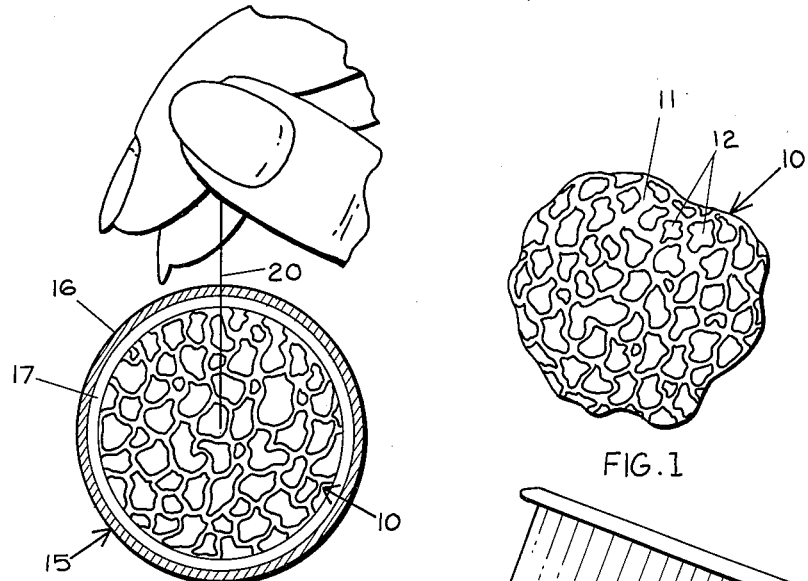
FIG.1
FIG.2
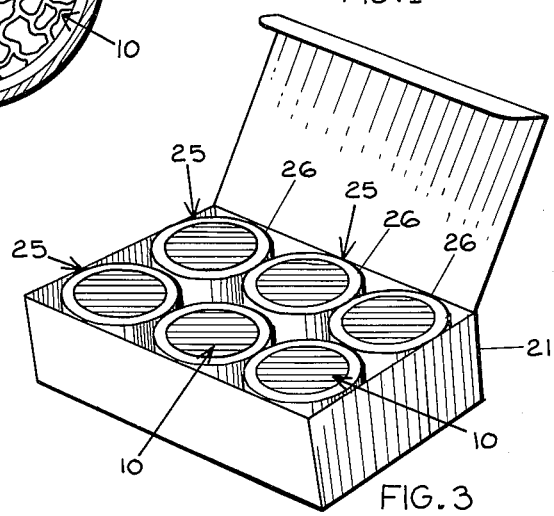
FIG.3
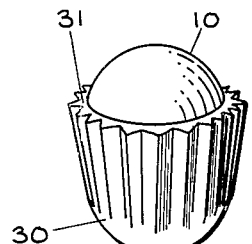
FIG.4
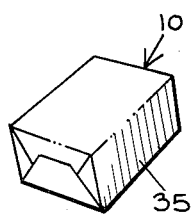
FIG. 5
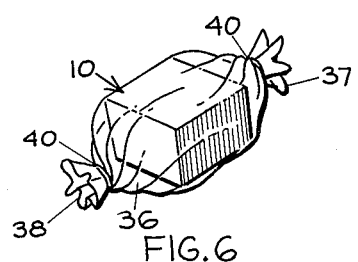
FIG.6
*INVENTOR.*
GEORGE CURT CURTISS
BY
Salvatore G. Militana,
attorney

2,973,273
SPONGE CHEWING GUM AND METHOD OF MAKING THE SAME

George Curt Curtiss, 187 NW. 67th St., Miami 50, Fla., assignor of twelve and one-half percent to Salvatore G. Militana, Miami, Fla.

Filed Feb. 11, 1959, Ser. No. 792,670

7 Claims. (Cl. 99—135)

This invention relates generally to chewing gum but is more particularly directed to a sponge-like mass of chewing gum whose cavities are filled with a confection.

A principal object of the present invention is to provide a non-edible basic substance such as chewing gum which has been converted to a spongy mass and saturating said mass with an edible confection.

Another object of the present invention is to provide a spongy mass of chewing gum with a liquid confection which fills the cavities of the spongy mass so that as one chews the gum, the liquid confection is given off in small quantities and thereby gives the gum a flavor for a relatively long period of time.

Another object of the present invention is to saturate a spongy mass of chewing gum with a liquid ice-cream of desired flavor and then freezing the mixture to form an ice-cream chewing gum.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a cross sectional view of a portion of somewhat spherical shape of my spongy chewing gum with ice cream interspersed throughout the mass of gum.

Figure 2 is a similar view of my sponge chewing gum which is coated and shown in section with a string attached for sanitary handling thereof.

Figure 3 is a perspective view of a box filled with my sponge chewing gum confection formed into cylindrically shaped portions.

Figure 4 is a perspective view of my sponge chewing gum confection shown in a cup shaped wrapper.

Figure 5 is a perspective view of a rectangular shaped portion of my sponge chewing gum wrapped in a conventional manner.

Figure 6 is a similar portion of sponge chewing gum packaged in a transparent wrapper.

Referring to the drawing wherein like numerals are used to designate similar parts throughout the several views, the numeral 10 refers to my sponge chewing gum which consists of a quantity of a non-edible basic substance 11 such as gum and the like treated to form a sponge-like mass. The spongy gum 11 has been prepared by boiling the conventional gum in water until a multiplicity of cavities or interstices have formed in the mass of gum, after which the gum 10 is cooled to preserve its spongy form. After it has hardened, the spongy mass of gum 10 is placed in a liquid bath of a desired confection. As a way of illustration, the confection used is liquid ice-cream 12 which is absorbed by the spongy mass of gum 11 and fills all of the cavities therein. After the sponge chewing gum 10 is frozen, the combination results in chewing gum having an intermixture of flavored ice-cream. Each bite into the chewing gum 10 releases a quantity of ice-cream that is detectable by one's palate.

The ice cream 12 keeps the chewing gum 11 fresh and cool while the chewing gum sponge 11 makes the ice cream 12 last a relatively long time. A preferred mixture of the sponge chewing gum 10 contains equal parts of gum 11 and confection 12. The sponge chewing gum 10 may be produced with any desired confection 11 and may be cut into any desired size though it is preferable if the size of each piece 10 be sufficiently small so that it can be placed at once in one's mouth and permit one to chew on it comfortably.

As best shown by Figure 2, a sponge chewing gum 15 is formed into a spherical shape with coatings 16 and 17 completely encompassing the spongy mass 10. A string 20 having one end affixed to the sponge mass 10 and extending outwardly is used for handling the sponge chewing gum 15 without contaminating the candy 15 and without getting any of the confection on one's person or clothes.

In Figure 3, the confection 25 contained in a conventional box 21 as formed into cylindrical shapes in which the sponge chewing gum 10 embracing any desired flavored confection is placed in a conventional cylindrical wrapper 26. A cup shaped wrapper 30 is used to contain the sponge chewing gum 10 shown in Figure 4. The sponge chewing gum 10 is embeded in a thickness of a confection 31. For example, the confection 31 may consist of a quantity of ice cream of which the sponge chewing gum 10 is filled.

The sponge chewing gum 10 may be cut into a rectangular or cube shape as shown by Figures 5 and 6. They can be wrapped in either an opaque wrapper 35 in the conventional manner as shown or by means of a tubular portion 36 of a transparent wrapper with both ends 37 and 38 tied by a string or twisted as at 40.

I claim:

1. A confectionery product comprising chewing gum having a plurality of cavities thereby forming a spongy mass and a confection embodied in said cavities.

2. A confectionery product comprising a mass of chewing gum in a spongy state and a confection embodied in said mass of chewing gum.

3. A confectionery product comprising a mass of spongy chewing gum and a confection embodied in said chewing gum, said mass of chewing gum and said confection being in a frozen state.

4. A confectionery product comprising a mass of spongy chewing gum with a liquid confection saturated throughout said spongy mass and said product being maintained in a frozen condition.

5. The method of producing a confectionery product comprising the steps of boiling a mass of chewing gum in a liquid until said mass becomes spongy and filling the cavities of said spongy mass with a confection.

6. A method of producing a confectionery product comprising the steps of boiling a mass of chewing gum in water until said mass becomes spongy, filling the cavities of said spongy mass with a liquid confection and subsequently freezing said product.

7. The method of producing a chewing gum ice-cream comprising the steps of boiling a mass of chewing gum in water at substantially 212° F. until said mass becomes spongy, immersing said spongy mass of chewing gum in a body of liquid confection whereby the spongy mass of chewing gum becomes saturated with said liquid confection, and freezing said saturated mass of chewing gum to form a chewing gum ice-cream.

References Cited in the file of this patent

UNITED STATES PATENTS

| 146,541 | Moore | Jan. 20, 1874 |
| 1,434,667 | Thompson | Nov. 7, 1922 |
| 1,786,606 | Gordon | Dec. 30, 1930 |